Sept. 6, 1960
O. KUJALA
2,951,708
COLLAPSIBLE STROLLER
Filed March 5, 1959
4 Sheets-Sheet 1
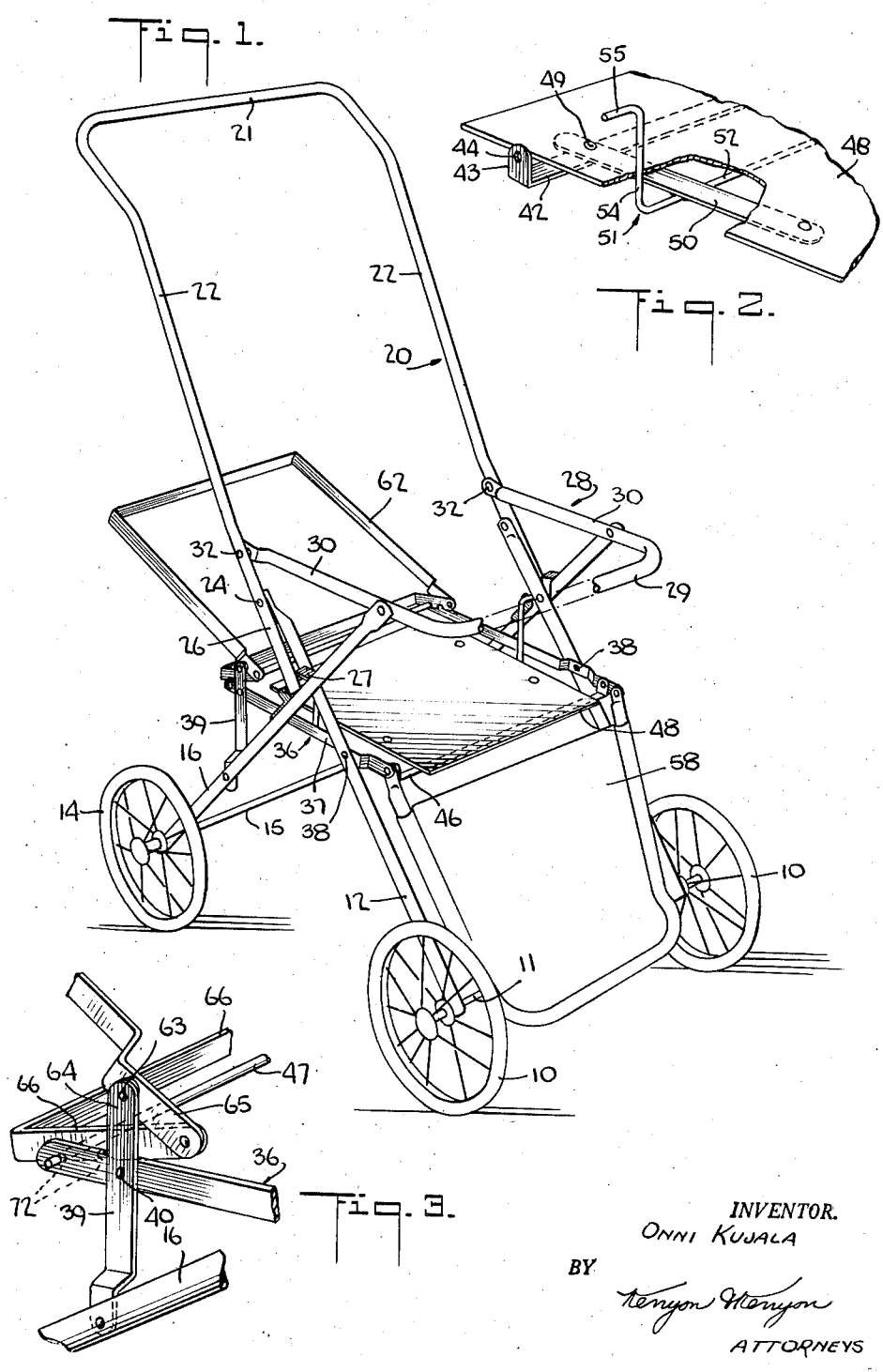
INVENTOR.
ONNI KUJALA
BY
Kenyon & Kenyon
ATTORNEYS

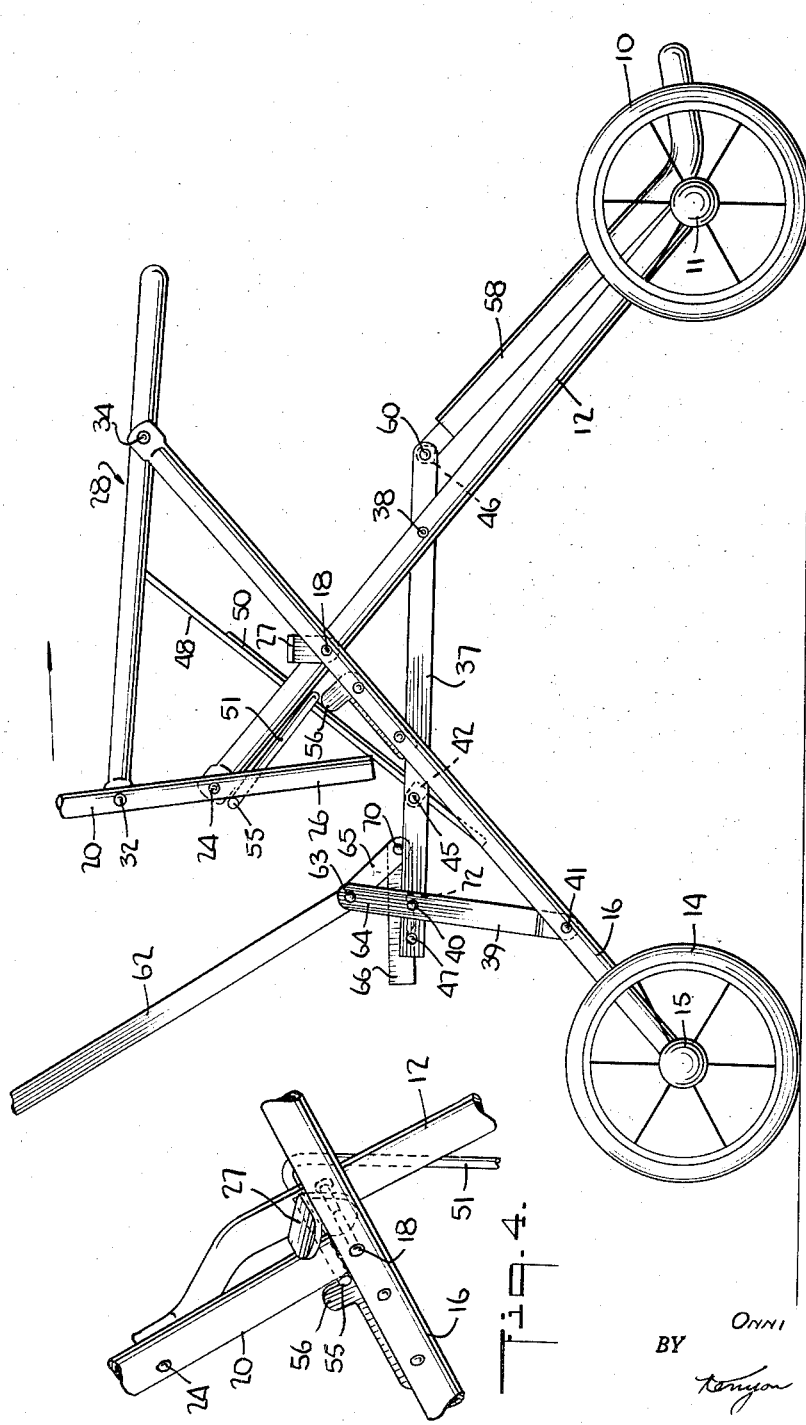

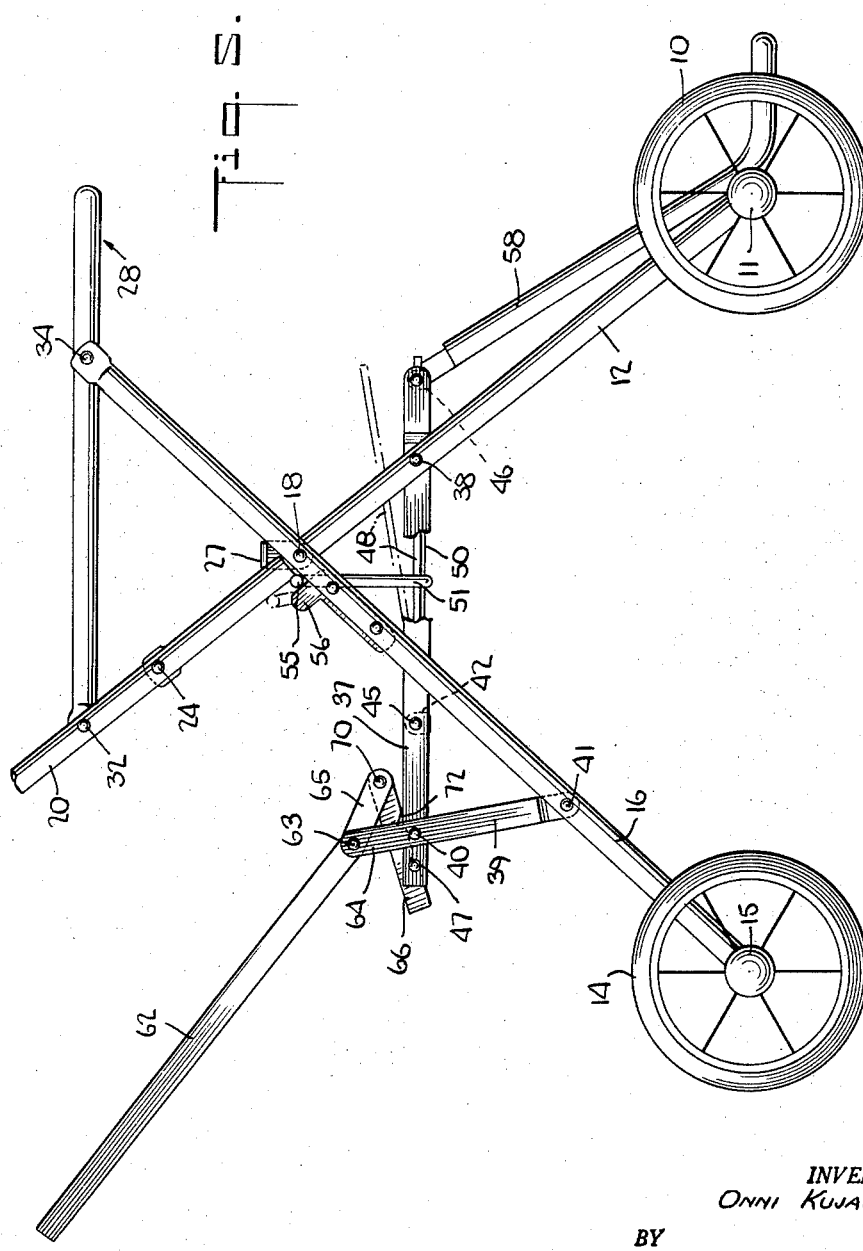

Sept. 6, 1960
O. KUJALA
2,951,708
COLLAPSIBLE STROLLER
Filed March 5, 1959
4 Sheets-Sheet 4
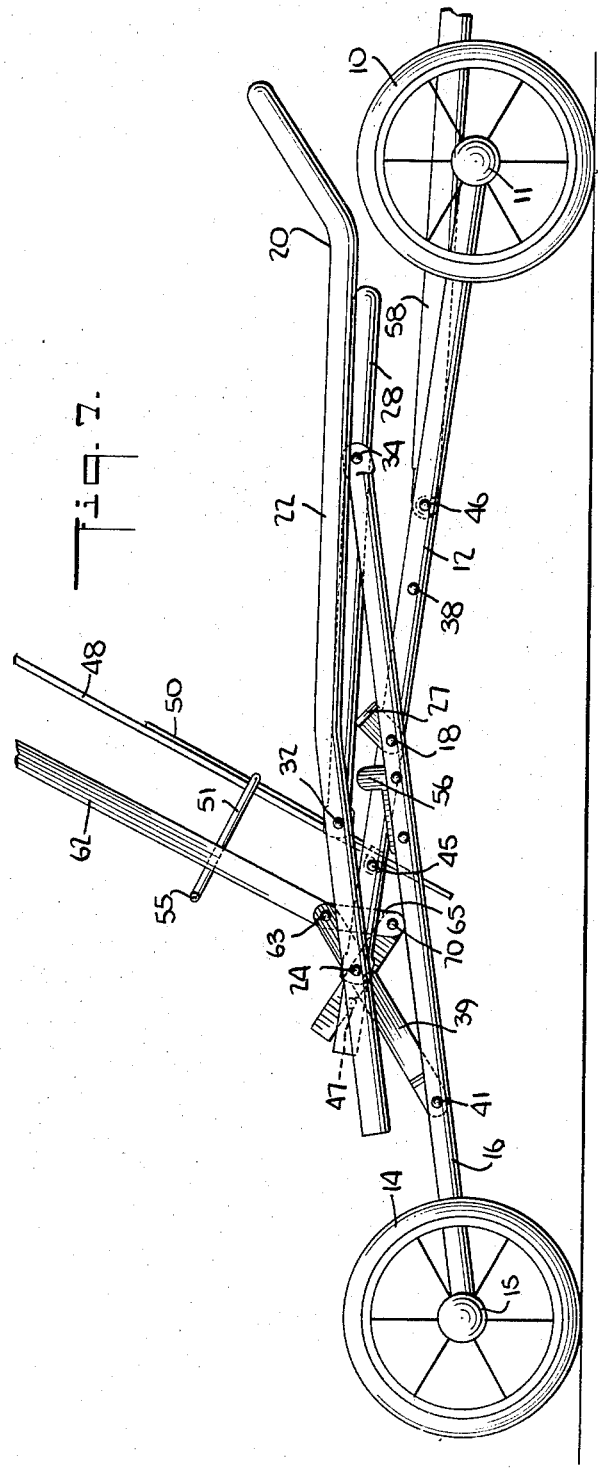
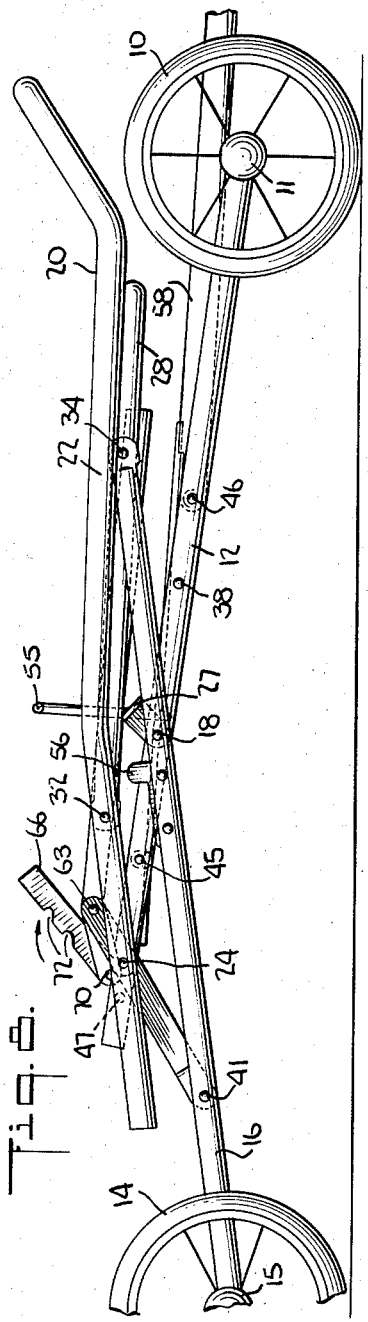
INVENTOR.
ONNI KUJALA
BY
*Kenyon & Kenyon*
ATTORNEYS United States Patent Office 2,951,708
Patented Sept. 6, 1960

2,951,708

COLLAPSIBLE STROLLER

Onni Kujala, Hubbardston, Mass., assignor to Courtland Furniture Co., Inc., New York, N.Y., a corporation of New York Filed Mar. 5, 1959, Ser. No. 797,422

4 Claims. (Cl. 280—41)

This invention relates to an improved collapsible child stroller having a locked assembly and rugged construction for long life and uniform operation.

It is one of the primary objects of the invention to provide a stroller of this type which is maintained safely in non-collapsible position so long as the seat is retained in its normal body-holding position.

It is a further object to provide a stroller of this type with coordinated parts contributing to the comfort of the occupant, such as the arm rest and adjustable back rest, permitting controlled collapse of these parts with the supporting elements of the stroller.

It is a further object of the invention to provide locking devices for preventing collapse of the stroller at all times that the seat is in or near its normal body-holding position, collapse being under the control of a reinforced yoke constituting the handle bar for the stroller.

The above and other objects will appear more fully from the following description when considered in connection with the drawings wherein:

Fig. 1 is a perspective view of the stroller in its normal operative position;

Fig. 2 is a detailed perspective view showing the mounting for the locking devices;

Fig. 3 is a similar perspective view showing the mounting and adjusting details for the back rest;

Fig. 4 is a similar detailed perspective view of the locking elements for preventing collapse of the stroller;

Fig. 5 is a side elevation of the stroller in its normal operating condition;

Fig. 6 is a side elevational view similar to Fig. 5 showing the locking element moved to unlocked position, and the initiation of the folding action;

Figs. 7 and 8 are similar side elevational views of the stroller showing respectively the partially collapsed and completely collapsed position of the stroller.

Referring now to the details of the stroller shown in the drawings the front wheels 10 and their transverse axles 11 are mounted at the lower end of the set of front wheel struts 12. The struts and axle form a yoke reinforced at their lower ends by the axle and upwardly thereof by attachment to the frame and other parts of the stroller. The rear wheels 14 and rear axle 15 are mounted on the set of rear struts 16, the construction being the same in general as for the front wheels and their supporting wheels and struts. The right hand front and rear struts and the left hand front and rear struts are hinged together by bolts or pins 18, aligned at the two sides of the vehicle and forming a horizontal pivotal connection for the wheel struts and wheels.

Control of the collapsible stroller is provided in a yoke shaped operating member 20 preferably constituting the handle bar for the stroller. It is formed with a cross bar 21 constituting the handle and side arms 22 forming the operating yoke. The side arms 22 are hinged to the upper ends of the front wheel struts 12 as indicated at 24. The hinge points 24 are spaced from the free ends of the side bars of the yoke 20 to provide projecting ends 26 which serve as the locking members to prevent hinging of the yoke 20. There is provided a stop bracket 27, preferably mounted on the hinge bolt or pin 18, on the inner end thereof, the free edge of the stop projecting outwardly into the plane of movement of the end 26 of the yoke 20 to prevent further downward movement of the upper end of the yoke as viewed in Fig. 5 for example. One such stop is preferably supplied for each side of the stroller.

There is provided a reinforcing yoke 28 normally extending in a generally horizontal plane and constituting the hand and arm rest for the occupant of the stroller. The yoke is formed with a front bar 29 and side arms 30 of a height generally corresponding to the arms of a child sitting in a stroller. Each side arm of the yoke 28 is hingedly connected to one arm of the handle bar 20 as indicated at 32. The side arms of the yoke 28, intermediate their ends, are hingedly connected to the upper ends of the rear wheel struts 16 as indicated at 34. The hinged connections of the side arms of the yoke 28 serve to produce collapse of the wheel struts on folding movement of the handle bar 20.

The frame construction on which the seat rests comprises a rectangular frame indicated generally at 36 and formed with side bars 37 hinged at 38 on each side of the frame respectively to the right hand and left hand wheel struts 12. Toward the rearward portion of the frame the side bars 37 are hingedly connected to an upper intermediate portion of the side links 39 at point 40, the lower end of the links 39 being hingedly connected to the rear wheel struts 16 as indicated at 41. Toward the rearward portion of the frame, in advance of the hinged connection 39 there is provided a transverse bar 42 (see Figs. 2 and 5) having upturned ends 43 formed with apertures 44 to be secured to the side frame as indicated at 45. The frame is formed with a forward or front cross bar 46 constituting a stop or rest for the seat 48. Extending across the rearward portion of the frame member 36 there is provided a cross bar 47 to serve as a control for the back rest of the stroller as will be hereinafter described. The seat is mounted for pivotal movement by being secured to the rearward cross bar 42 as indicated at 49, to permit vertical pivotal movement of the main body of the seat forwardly of the cross bar 42.

The seat is secured to the frame by means of attachment brackets 50 secured rigidly to the seat body, one adjacent each side thereof, the brackets carrying the rigid locking bar 51 as shown in Fig. 2. The locking bar is formed with a main body portion 52 extending across the seat and welded or otherwise secured to the attachment brackets 50. The bar 51 is formed with upwardly extending side arms 54 carrying free projecting ends 55 constituting the locking elements to limit collapse of the stroller. There is secured to the rear wheel struts 16 an abutment 56, spaced slightly from the front wheel struts and projecting ends 26 of the handle bar, sufficiently to receive the projecting ends 55 of the locking bar between the front wheel strut 12 and abutment 56 when the locking bar is moved to locking position by lowering the seat to normal body-holding position.

There is provided a foot rest 58 hinged as at 60 to the main frame, the foot rest having the usual adjustable connections (not shown) for maintaining it in any normal position or else permitting it to hinge about the horizontal axis formed by the hinge 60. The back rest 62 is hingedly connected as indicated at 63 to upper extensions 64 on links 39. The back rest frame 62 is formed with extensions or projecting ends 65 hingedly connected to latch bar 66, the side arms 68 of the latch bar being connected to extensions 65 by pins or bolts 70 to permit vertical movement of the latch bar. On the lower edges of the side arms 68 there are provided a series of slot 72 selectively engageable with the rear cross bar 47 for maintaining the back rest 62 at the desired angle with respect to the body frame and seat.

In the use of the stroller in the condition shown in Fig. 1 it will be seen that the wheels are connected by straight line wheel struts extending up angularly to the pivot point of the struts on each side of the stroller, most of the parts being of yoke formation with reinforcing cross bars so that there is provided a sturdy stroller structure. The seat 48 when in its normal position is as shown in Fig. 1 and in full lines in Fig. 5. The projecting ends 55 of the locking bar are positioned between the abutment 56 and the lower projecting end 26 of the handle bar. In this position the locking bar serves effectively to prevent collapse of the stroller by preventing hinged movement of the handle bar. In locked position the locking ends 55 are prevented from being forcibly moved by the ends 26 of the handle bar by reason of the abutments 56 preventing rearward movement of the ends of the locking bar and projectiong end 26 of the operating yoke. After the child has been removed from the stroller and the seat 48 moved to slightly elevated position as shown in dotted lines in Fig. 5, the handle bars can be hinged forwardly to produce the ready collapse of the vehicle. Even in this position of the seat shown in dotted lines in Fig. 5, if this event should occur accidentally while the child is occupying the seat, collapse of the handle bar and the wheel struts is prevented because the ends of the locking bar are still in position adjacent the projecting ends 26, thereby preventing collapse of the vehicle. For a complete collapse of the vehicle the locking ends of the bar 51 must be moved to such an extent that the seat is elevated to the position shown in Fig. 6, such position of the seat being impossible if the stroller is occupied.

The unoccupied stroller can be readily collapsed and folded by one operator by the very simple operation of moving the seat upwardly with one hand to a position such that the free ends of the locking bar are above the abutment 56 as shown in Fig. 5. With the other hand the operator can then move the handle bar forwardly and the rearward movement of the projecting ends 26 on the handle bar will cause the seat to be elevated to a greater height thus moving the ends of the locking bar rearwardly as the seat is elevated to the position shown in Fig. 6. During this movement the side arms 30 of the arm rest 28 cause the rear wheel struts to be hinged about the hinge bolts 18 with the result that the front and rear wheel struts are hinged into substantially aligned position as shown in Fig. 7. In this position the main body of the stroller comprising the wheels, struts, handle bar, seat and frames are collapsed to the desired extent. The seat 48 can then be hinged downwardly carrying the locking bar to the position shown in Fig. 8. The back rest can be hinged into the general plane of the collapsed stroller by raising the latching bar 66 to disengage the slots 72 from the rearward cross bar on the frame.

From the above construction it will be noted that there is provided a stroller suitably braced to provide a rugged safely locked carriage for transport of a child. When unlocked the carriage is readily collapsed into a substantially planer condition so that the folded carriage can be suitably stored or transported.

While the locking bar is preferably carried directly by the seat, for convenience, it will be understood that a separate bar and handle may be employed and placed beneath the seat or otherwise mounted to be controlled by the position of the seat.

The stroller herein disclosed will preferably be covered with a suitable cover, including seat cushion and back rest, such cover forming no part of my present invention.

The particular construction here shown, while presently believed to be the best form of device now known for the intended purpose, is set forth for purposes of illustration only, and not with any intention of limiting the invention, whose scope is set forth in the claims appended hereto.

What is claimed is:

1. A stroller having a collapsible frame comprising two pairs of crossed struts, each of said pairs being constituted by two struts pivotally connected at a point intermediate their respective ends, one pair of said struts being at each side thereof and defining symmetrical sets of front and rear struts, a seat frame pivotally connected to both of said set of front struts, two links pivotally connected at one of their respective ends to the said seat frame and at the other of their respective ends to respective ones of said set of rear struts, a seat hingedly disposed within said seat frame, a handle having a cross bar and side arms pivotally connected near their free ends to the respective upper portions of said set of front struts so that a free length of said arms extends downwardly below the points of connection of the side arms and the front struts, the said free length of said arms being approximately equal to the distance between said last-named points of connection and the respective points of connection of said pairs of crossed struts, a U-shaped member having two legs and a bracket connecting said legs to form a U, each of said legs of said U-shaped member being pivotally connected to the upper portion of a respective one of the said set of rear struts at a point on the said leg adjacent the connection of said bracket to said leg, and each of said legs of the said U-shaped member being also connected to a respective one of said side arms between said cross bar and the connection of said side arm to the respective upper portion of one of said set of front struts, the last-named connections being at points on the legs of said U-shaped members adjacent the free ends thereof, and latch means adapted to lock said frame in an operative position comprising means immovably mounted on one of the struts of each pair of crossed struts, said means being mounted adjacent the respective points of connection of the pairs of crossed struts and being adapted to prevent pivotal movement of the free portions of said handle side arms in the direction of frame erection past the position of full frame erection, abutment means immovably mounted on each of said set of rear struts at points adjacent the respective connections of said pairs of crossed struts, and means immovably attached to said hinged seats and adapted to cooperate with said abutment means to prevent pivotal movement of the free portions of said handle side arms in the direction of frame collapse away from the position of full frame erection when said seat is horizontally disposed in said seat body, and further disposed to allow pivotal movement of said free arm portions in the direction of frame collapse when said seat is hingedly moved upward a substantial arcuate distance relative to said seat frame.

2. A stroller having a collapsible frame comprising two pairs of crossed struts, each of said pairs being constituted by two struts pivotally connected at a point intermediate their respective ends, one pair of said struts being at each side thereof and defining symmetrical sets of front and rear symmetrical struts, a seat frame pivotally connected to both of said set of front struts, two links pivotally connected at one of their respective ends to the said seat frame and at the other of their respective ends to respective one of said set of rear struts, a seat hingedly disposed within said seat frame, a handle having a cross bar and side arms pivotally connected near their free ends to the respective upper portions of said set of front struts so that a free length of said arms extend downwardly below the points of connection of the side arms and the front struts, the said free length of said arms being approximately equal to the distance between said last-named points of connection and the respective points of connection of said pairs of crossed struts, a U-shaped member having two legs and a bracket connecting said legs to form a U, each of said legs of said U-shaped member being pivotally connected to the upper portion of a respective one of the said set of rear struts at a point on the said leg adjacent the connection of said bracket to said leg and each of said legs of said U-shaped member being also connected to a respective one of said side arms to said handle at a point on said side arms between said cross bar and the connection of said side arm to the respective upper portion of one of said set of front struts, the last-named connections being at points on the legs of said U-shaped members adjacent the free ends thereof, and latch means adapted to lock said frame in an operative position comprising stop means immovably mounted on one of the struts of each pair of crossed struts, said means being mounted adjacent the respective points of connection of the pairs of crossed struts and being adapted to prevent pivotal movement of the free portions of said handle side arms in the direction of frame erection past the position of full frame erection, abutment means immovably mounted on each of said set of rear struts at points adjacent the respective connections of said pairs of crossed struts, and locking means immovably attached to said hinged seat which project outwardly from said seat adapted to cooperate with said abutment means to contact and prevent pivotal movement of the free portions of said handle side arms in the direction of frame collapse away from the position of full frame erection when said seat is horizontally disposed in said seat frame, and further disposed to move in an arcuate path toward the pivot connection of said handle side arms and said front struts when said seat is hingedly moved upward through an equal arc relative to said frame, thereupon allowing pivotal movement of said free arm portions in the direction of frame collapse when said seat is hingedly moved upward a tubstantial arcuate distance so as to move said locking means to the vicinity of the pivot of said handle side arms and said front struts.

3. The apparatus of claim 2 wherein said locking means comprises said outward projection from said seat and an abutment on one of said struts in the strut crossing vicinity located so as to be free of the pivotal action of said handle arms lower free portions and adapted to support the free end of said outward projection when said seat is in the horizontal position flush with said seat body.

4. The apparatus of claim 2 wherein said stop means comprises a fixed member positioned at the crossing of said struts and which projects into the arcuate path of the lower free end portions of said handle side arms.

References Cited in the file of this patent
UNITED STATES PATENTS

| | | |
|---|---|---|
| 822,944 | Halladay | June 12, 1906 |
| 2,383,039 | Bushnell | Aug. 21, 1945 |
| 2,751,232 | Sundberg | June 19, 1956 |
| 2,872,203 | Hedstrom | Feb. 3, 1959 |

FOREIGN PATENTS

| | | |
|---|---|---|
| 910,876 | France | Feb. 18, 1946 |
| 639,439 | Great Britain | June 28, 1950 |